United States Patent
Yuan et al.

(10) Patent No.: US 12,541,418 B2
(45) Date of Patent: Feb. 3, 2026

(54) TEMPORAL GRAPH-BASED INCIDENT ANALYSIS AND CONTROL IN CYBER PHYSICAL SYSTEMS

(71) Applicant: NEC Laboratories America, Inc., Princeton, NJ (US)

(72) Inventors: Peng Yuan, Princeton, NJ (US); LuAn Tang, Cranbury, NJ (US); Haifeng Chen, West Windsor, NJ (US); Yuncong Chen, Plainsboro, NJ (US); Zhengzhang Chen, Princeton Junction, NJ (US); Motoyuki Sato, Cupertino, CA (US)

(73) Assignee: NEC Corporation, Tokyo (JP)

( * ) Notice: Subject to any disclaimer, the term of this patent is extended or adjusted under 35 U.S.C. 154(b) by 3 days.

(21) Appl. No.: 18/594,487

(22) Filed: Mar. 4, 2024

(65) Prior Publication Data
US 2024/0354184 A1    Oct. 24, 2024

Related U.S. Application Data

(60) Provisional application No. 63/460,674, filed on Apr. 20, 2023, provisional application No. 63/523,382, filed on Jun. 27, 2023.

(51) Int. Cl.
*G06F 11/00*     (2006.01)
*G06F 11/07*     (2006.01)
(Continued)

(52) U.S. Cl.
CPC ........ *G06F 11/079* (2013.01); *G06F 11/0736* (2013.01); *G06F 11/0793* (2013.01); *G06F 11/327* (2013.01); *G06F 11/3452* (2013.01)

(58) Field of Classification Search
CPC ............... G06F 11/079; G06F 11/0736; G06F 11/0793; G06F 11/327; G06F 11/3452
See application file for complete search history.

(56) References Cited

U.S. PATENT DOCUMENTS

2017/0228277 A1*  8/2017  Cheng ................. G06F 11/0709
2018/0307994 A1* 10/2018  Cheng ..................... G06N 5/022
(Continued)

OTHER PUBLICATIONS

Written Opinion of the International Searching Authority PCT/US2024/018500 (Year: 2024).*
(Continued)

*Primary Examiner* — Elmira Mehrmanesh
(74) *Attorney, Agent, or Firm* — Vincent Duffy; Joseph Kolodka

(57) ABSTRACT

Systems and methods are provided for incident analysis in Cyber-Physical Systems (CPS) using a Temporal Graph-based Incident Analysis System (TGIAS) and/or Transition Based Categorical Anomaly Detection (TCAD). Dynamically gathered multimodal data from a distributed network of sensors across the CPS are preprocessed to identify abnormal sensor readings indicative of potential incidents, and a multi-layered incident timeline graph, representing abnormal sensor readings, relationships to specific CPS components, and temporal sequencing of events is constructed. Severity scores are calculated, and severity rankings are assigned to identified anomalies based on a composite index including impact on CPS operation, comparison with historical incident data, and predictive risk assessments. Probable root causes of incidents and pathways for anomaly propagation through the CPS are identified using causal interference and the incident timeline graph to detect underlying vulnerabilities and predict future system weaknesses. Recommended actions are generated and executed for incident resolution and system optimization.

20 Claims, 13 Drawing Sheets

(51) Int. Cl.
  *G06F 11/32* (2006.01)
  *G06F 11/34* (2006.01)

(56) References Cited

U.S. PATENT DOCUMENTS

| | | | |
|---|---|---|---|
| 2020/0019858 A1* | 1/2020 | Han | G06N 3/048 |
| 2020/0103878 A1* | 4/2020 | Sayyar | G05B 13/042 |
| 2020/0112577 A1* | 4/2020 | Han | G06F 21/552 |
| 2021/0089661 A1* | 3/2021 | Rieger | G06F 11/0736 |
| 2021/0133080 A1* | 5/2021 | Cheng | G06F 11/3013 |
| 2022/0229430 A1* | 7/2022 | Balasubramanian | G05B 23/0245 |
| 2023/0256373 A1* | 8/2023 | Johnson | B01D 46/0086 701/34.4 |
| 2023/0280739 A1 | 9/2023 | Yuan et al. | |
| 2023/0281186 A1* | 9/2023 | Yuan | G06F 16/2365 707/691 |
| 2024/0064161 A1* | 2/2024 | Liu | H04L 41/069 |

OTHER PUBLICATIONS

Yuan, P., Tang, L. A., Chen, H., Sato, M., & Woodward, K. (Jan. 2, 2022). 3D histogram based anomaly detection for categorical sensor data in Internet of Things. Open Journal of Internet Of Things (OJIOT), 8(1), 32-43.

Yuan, P., Tang, L. A., Chen, H., Sato, M., & Woodward, K. (Sep. 19, 2022). Explainable Anomaly Detection System for Categorical Sensor Data in Internet of Things. In Joint European Conference on Machine Learning and Knowledge Discovery in Databases (pp. 594-598). Cham: Springer Nature Switzerland.

Yuan, P., Tang, L. A., Chen, H., Chang, D. S., Sato, M., & Woodward, K. (Sep. 17, 2023). Temporal Graph Based Incident Analysis System for Internet of Things. In Joint European Conference on Machine Learning and Knowledge Discovery in Databases (pp. 305-309). Cham: Springer Nature Switzerland.

* cited by examiner

TEMPORAL GRAPH-BASED INCIDENT ANALYSIS AND CONTROL IN CYBER PHYSICAL SYSTEMS

RELATED APPLICATION INFORMATION

This application claims priority to Provisional Application Nos. 63/460,674, filed on Apr. 20, 2023, and 63/523,382, filed on Jun. 27, 2023, the contents of both of which are incorporated herein by reference in their entirety.

This application is related to an application entitled "TEMPORAL GRAPH-BASED ANOMALY ANALYSIS AND CONTROL IN CYBER PHYSICAL SYSTEMS", having Ser. No. 18/594,582, filed concurrently herewith, and which is incorporated by reference herein in its entirety.

BACKGROUND

Technical Field

The present invention relates to monitoring, diagnostic, and corrective actions for Cyber-Physical Systems (CPS) and, more particularly, to methods and systems for detecting anomalies and executing real-time corrective actions across various vehicles and structures using Transition Based Categorical Anomaly Detection (TCAD) and a Temporal Graph-based Incident Analysis System (TGIAS).

Description of the Related Art

Cyber-Physical System (CPS) contains thousands of sensors to monitor the operational state of the system. Anomaly monitoring and detection is a critical task for CPS maintenance and operation. Many anomalies are based on the relationship of sensor values, not the readings of single sensors. In addition, there are a large portion of sensors that report categorical values rather than numerical readings.

Some challenges of anomaly detection in CPS include usage of a large number of sensors, determining a relationship between the sensors, and identifying which sensors can cause the most damage to a particular system from anomalies in the system. Conventional state-of-the-art anomaly detection systems and methods are designed only for numerical sensor readings, and they cannot detect the relationship among categorical sensors. Hence, conventional systems are not capable for use by CPS in real-time monitoring or corrective action tasks.

SUMMARY

According to an aspect of the present invention, a method is provided for incident analysis in Cyber-Physical Systems (CPS) using a Temporal Graph-based Incident Analysis System (TGIAS). Dynamically gathered multimodal data from a distributed network of sensors across the CPS are preprocessed to identify abnormal sensor readings indicative of potential incidents, and a multi-layered incident timeline graph, representing abnormal sensor readings, relationships to specific CPS components, and temporal sequencing of events is constructed. Severity scores are calculated, and severity rankings are assigned to identified anomalies based on a composite index including impact on CPS operation, comparison with historical incident data, and predictive risk assessments. Probable root causes of incidents and pathways for anomaly propagation through the CPS are identified using causal interference and the incident timeline graph to detect underlying vulnerabilities and predict future system weaknesses. Recommended actions are generated and executed for incident resolution and system optimization.

According to another aspect of the present invention, a method is provided for detecting anomalies in a Cyber-Physical System (CPS) using Transition Based Categorical Anomaly Detection (TCAD). Historical normal categorical data is received from a plurality of sensors within the CPS and a transition library is automatically generated for each sensor based on the received data, wherein the transition library represents categorical state transitions for the sensor. A sensor relationship graph model is constructed based on identified transition points from the transition library, and each edge of the graph represents a transition relationship between a pair of sensors. Additional sensor data is sampled using a sliding window technique, a relationship score is calculated for each edge of the graph model based on the sampled data, and a normal relationship range for each edge is determined using a Weibull distribution. A threshold for the amount of broken edges is evaluated in the relationship graph model, and a broken edge indicates a potential anomaly. An alert is issued and corrective actions are performed if the amount of broken edges exceeds the threshold.

According to another aspect of the present invention, a system is provided for incident analysis in Cyber-Physical Systems (CPS) using a Temporal Graph-based Incident Analysis System (TGIAS) and/or Transition Based Categorical Anomaly Detection (TCAD). A processor is configured for dynamically gathering multimodal data from a distributed network of sensors across the CPS are preprocessed to identify abnormal sensor readings indicative of potential incidents, and a multi-layered incident timeline graph, representing abnormal sensor readings, relationships to specific CPS components, and temporal sequencing of events is constructed. Severity scores are calculated, and severity rankings are assigned to identified anomalies based on a composite index including impact on CPS operation, comparison with historical incident data, and predictive risk assessments. Probable root causes of incidents and pathways for anomaly propagation through the CPS are identified using causal interference and the incident timeline graph to detect underlying vulnerabilities and predict future system weaknesses. Recommended actions are generated and executed for incident resolution and system optimization.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
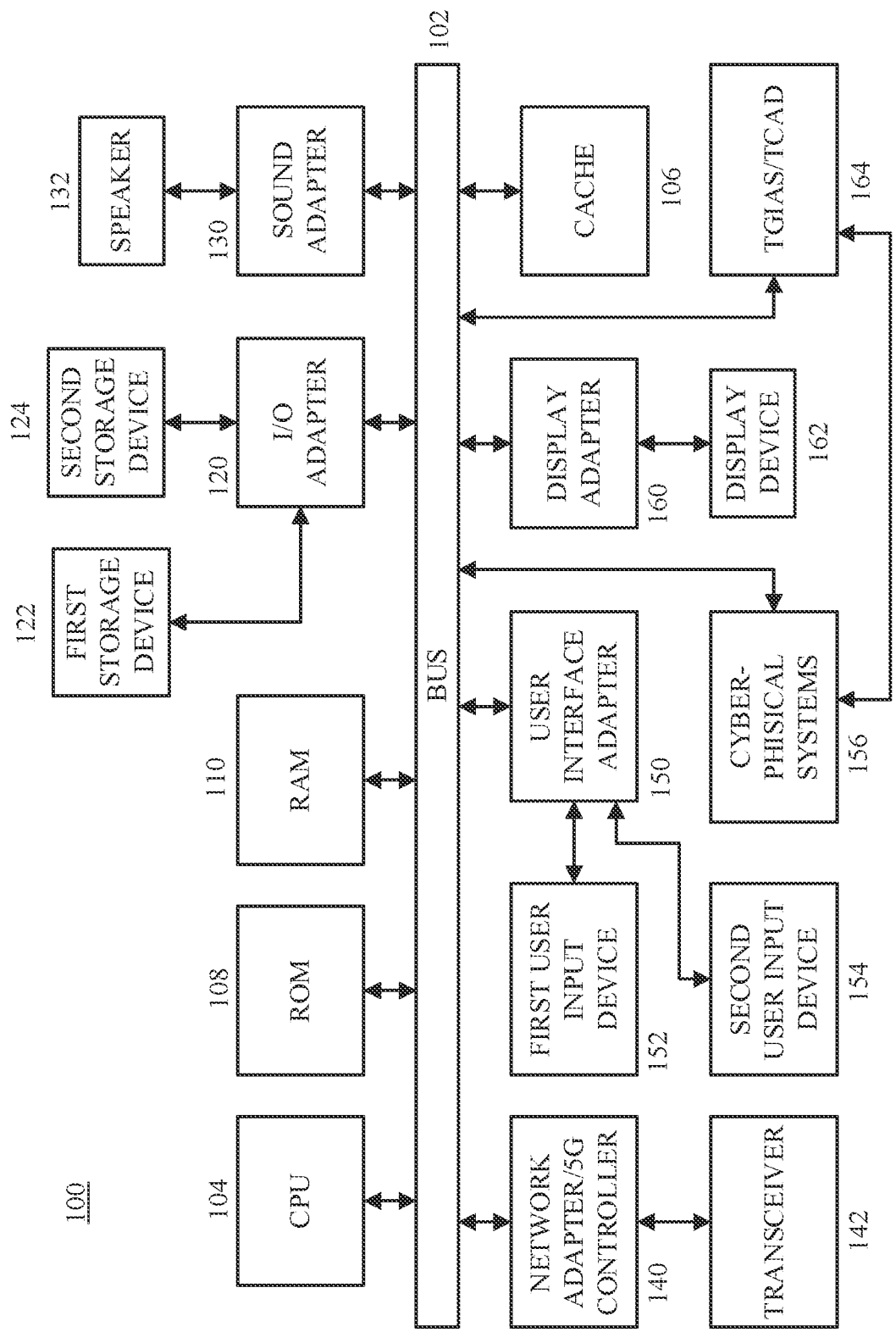
FIG. 1 is a block diagram illustratively depicting an exemplary processing system to which the present invention may be applied, in accordance with embodiments of the present invention.

In accordance with embodiments of the present invention, systems and methods are provided for monitoring, diagnostic, and corrective actions for Cyber-Physical Systems (CPS). More particularly, the present invention can include an integrated system and method for detecting anomalies and executing real-time corrective actions across various vehicles and structures using Transition Based Categorical Anomaly Detection (TCAD) and a Temporal Graph-based Incident Analysis System (TGIAS).

In some embodiments, in Cyber-Physical System (CPS) applications, thousands of sensors can be deployed to monitor the operational state of the system. Anomaly monitoring and detection is a critical task for CPS maintenance and operation. The CPS monitoring component may detect a few abnormal events. However, in conventional systems, it is very difficult or impossible for the end users to understand the detected anomalies and analyze the root causes, and as such proper reactions to repair the damage may not be taken, which can cause outages and/or poor performance of various systems.

Some challenges of anomaly analysis and incident correct in CPS include, for example, a large number/amount of sensors, relationships of the sensors, and identifying top k causality components. Regarding the large number/amount of sensors, in CPS, a system-level anomaly may involve hundreds of sensors, which are not possible for end-users to check manually, and can utilize the analysis system to provide such identification and to provide a priority list so that they can focus on the most seriously damaged components. In CPS, there are a plurality of relationships among different sensors and their readings are influenced by each other. In a typical abnormal event, there are temporal differences on the abnormal signals of the sensors, and in some embodiments, the present invention can be utilized to build up such timelines to understand the abnormal events.

An important part of anomaly analysis according to various embodiments of the present invention can include determining which sensors can comparatively cause the most damage to a particular system. In various embodiments, the system can only be repaired completely by fixing a root cause, but such root cause sensors may only detect and report minor anomalies by themselves, which can be challenging to identify. CPS is generally coupled with a comparatively large amount of noise and normal dynamics, and as such a monitoring system may detect a large number/amount of false alerts (e.g., false positives). The present invention can filter out these false alerts and only keep the meaningful ones (e.g., true positives) for further analysis, issuing corrective actions, and/or reporting to an end user. The sensor data of CPS is comparatively extremely large, and can be in streaming format. Thus, analysis tools must be capable of processing large volumes of sensor data and identifying patterns indicative of potential issues in a system for efficient and effective detection and correction of such potential issues, in accordance with aspects of the present invention.

In some embodiments, to address these challenges, an efficient analysis system called Temporal Graph based Incident Analysis System (TGIAS) can be utilized to identify components that suffer the most damage (e.g., top k anomalies) and those that are comparatively more likely to cause the most damage to others (e.g., top k root causes). This system can perform effective management of CPS, as it can enable prioritization of efforts and resources towards the most critical components of CPS. Further, TGIAS can be integrated with other operational tools to provide a comprehensive view of the system's performance and enable users to make informed decisions and/or automatically react (e.g., issue corrective actions, notify users, etc.) to the abnormal events in real-time, in accordance with aspects of the present invention.

In various embodiments, TGIAS can construct an incident timeline graph from the abnormal sensors and relationship sensor graph of historical data. The incident timeline graph demonstrates the temporal relationship of the abnormal sensors and can help to filter out the false positive ones. TGIAS can include a seriousness measurement to judge the level of anomaly for each sensor. In this way, the system can identify and filter the top k serious sensors for further analysis, corrective actions, and/or notification of end user for detailed analysis. TGIAS can automatically conduct a reasoning process on the incident timeline graph and find out the top k sensors that caused highest level of severity to the system (i.e., top k root causes of the incident), noting that TGIAS is comparatively more efficient than conventional systems and methods, and as such, can be deployed as an online (e.g., remote) service to analyze and correct incidents in real-time, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more video cameras 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the scope of the present principles. The user input devices 152, 154 can be the same type of user input device or different types of user input devices. The user input devices 152, 154 are used to input and output information to and from system 100, in accordance with aspects of the present invention. Cyber-Physical Systems (CPS) 156 can be monitored for incidents and anomalies, using TGIAS and/or TCAD devices in block 164, which can be operatively connected to the system 100 for anomaly detection and correction for Cyber-Physical Systems (CPS) using a Temporal Graph-based Incident Analysis System (TGIAS) and/or Transition Based Categorical Anomaly Detection (TCAD), in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 700, 1200, and 1300 described below with respect to FIGS. 2, 7, 12, and 13, respectively, are systems for implementing respective embodiments of the present invention. Part or all of processing system 100 may be implemented in one or more of the elements of systems 200, 700, 1200, and 1300 in accordance with aspects of the present invention.

Further, it is to be appreciated that processing system 100 may perform at least part of the methods described herein including, for example, at least part of methods 200, 300, 400, 500, 600, 700, 800, 900, 1000, 1100, and 1300, described below with respect to FIGS. 2, 3, 4, 5, 6, 7, 8, 9, 10, 11, and 13, respectively. Similarly, part or all of systems 200, 700, 1200, and 1300 may be used to perform at least part of methods 200, 300, 400, 500, 600, 700, 800, 900, 1000, 1100, and 1300 of FIGS. 2, 3, 4, 5, 6, 7, 8, 9, 10, 11, and 13, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
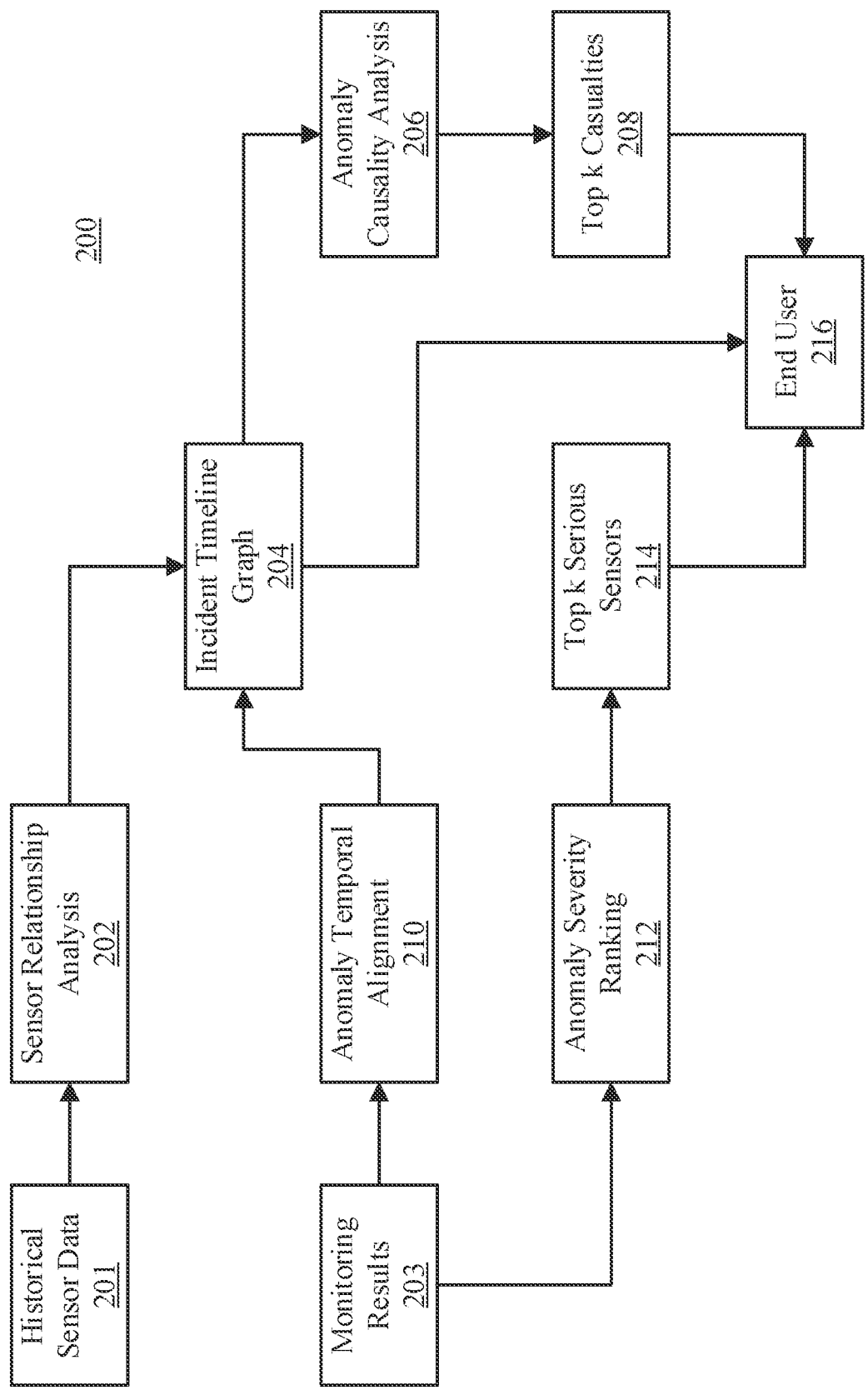
FIG. 2 is a diagram illustratively depicting a high-level view of a system and method for incident detection and correction using a Temporal Graph-based Incident Analysis System (TGIAS), in accordance with embodiments of the present invention.

Referring now to FIG. 2, a high-level view of a system and method 200 for incident detection and correction using a Temporal Graph-based Incident Analysis System (TGIAS), is illustratively depicted in accordance with embodiments of the present invention.

In various embodiments, historical sensor data can be acquired and/or received as input in block 201. This data encapsulates past sensor readings, which can be instrumental in establishing a baseline for normal operational patterns and behaviors within the CPS. Following the intake of historical data, sensor relationship analysis 202 can be conducted to ascertain the intricate web of interdependencies and correlations among different sensor outputs. This analysis can be utilized for understanding how sensors influence one another and for mapping the propagation path of potential anomalies.

In CPS, a number of sensors can be installed to oversee different components or sub-systems. Generally, the sensors in the same component or sub-system report relevant signals. However, the group and relationship of sensors are not provided in advance in CPS applications, and thus, an initial task of TGIAS is to discover the relationship among sensors.

The sensor correlations between s_x and s_y can be computed as the Pearson correlation, as shown by the following formula, where r_xy is correlation value, x_i and y_i are the sensor readings at time t_i, x_bar and y_bar are the average value of the readings:

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

Note that, it is conventionally computationally expensive and difficult to compute the correlation among categorical sensors by Pearson correlation, since the categorical readings are different from numerical values. The present invention can utilize transition points to solve this problem. The Pearson correlation can be computed between each pair of sensors, and if the correlation is larger than a pre-defined threshold δ_t, an edge will be added between the sensors, in accordance with aspects of the present invention.

In various embodiments, the sensor signals within the same sub-system have strong correlations to each other, while the signals from different subsystems have low correlations. Therefore, TGIAS can make sub-system division by performing the correlation analysis on the historical data. TGIAS can generate a correlation graph as output, in which the nodes are the sensors and the edges represent the (strong) correlations among different sensors. For the illustrative example of an automobile, a relational graph can be constructed to represent sensors of a car (noting a car can be a typical CPS), in which there can be, for example, 50 or more sensors, each represented by a node. If two sensor's signals have comparatively high correlations, an edge can be constructed to link the two nodes. In the graph, sensors can be divided into several sub-systems (e.g., engine, door control, air control, braking, turning, audio, battery, etc.), in accordance with aspects of the present invention.

In some embodiments, monitoring results in block 203 can be collected in real-time simultaneously (e.g., in parallel) providing up-to-date information on the current state of the system. These results can be utilized for detecting deviations from expected behavior, which may indicate malfunctions or external perturbations affecting the system, in accordance with aspects of the present invention. The results can be in a format of abnormal score stream: S={n_i, j}, where i indicates the timestamp ti and j indicates the sensor sj·n_i, j is a score between [0,1],0 means there is no anomaly, and if the score is close to 1, it indicates higher abnormal scores.

Upon detection, anomalies can be temporally aligned in the anomaly temporal alignment block 210, which represents a process that synchronizes the anomalies across the system timeline, aiding in the construction of an incident timeline graph in block 204. This graph is a visual and analytical tool that chronicles the sequence of anomalies, plotting them against the time axis to reveal the progression and escalation of the incident. Next, the anomaly severity ranking in block 212 can assess each anomaly's impact based on several criteria, including, for example, the duration of the anomaly, its intensity relative to the baseline, and the sensor's reliability (e.g., accounting for false positives during normal operations). This assessment can generate a prioritized list of sensors with the most comparatively critical anomalies, referred to as top k serious sensors in block 214, which can require immediate attention for maintenance and corrective actions to avoid further system incidents and failures, in accordance with aspects of the present invention.

In various embodiments, the system 200 can include a monitoring system (e.g., anomaly detector), which can process all the CPS data online and can generate the anomalies for each sensor in a continuous manner. Such anomalies can include, for example, normal, frequency anomaly, duration anomaly, new value anomaly, and rare event anomaly. The TGIAS system 200 can take input from generated abnormal matrices and output the alignment of abnormal sensors as the framework for the temporal graph 204, which can include several steps, such as computing an incident threshold, generating incident candidate periods, merging candidate periods and determining the final incident period, and aligning the abnormal sensors nodes along a time period, in accordance with aspects of the present invention.

In a parallel analytical thread, an anomaly causality analysis can be performed in block 206, which can determine the precedence of anomalies and the distribution of causality based on sensor interrelations, to compute causality scores. This analysis can determine the likelihood of each sensor's role in instigating subsequent anomalies, leading to the identification of the top k casualties in block 208. These can be representative of sensors that may not exhibit the highest severity of anomalies but can be instrumental in the cascade of system failures and thus can be critical to understanding the incident's genesis. The synthesized data from both severity and causality analyses can culminate at the end user interface in block 216, where the processed information can be presented in a user-friendly manner, and can either automatically execute corrective actions (e.g., turning off a component, adjusting air flow through filters, turning on a component, redirecting resources, etc.), or can send an alert and provide a user interface to enable the system operators or maintenance personnel to make informed decisions about which components to address first and perform corresponding corrective actions, based on a combination of severity and causality, to restore the system to its nominal operational state, in accordance with aspects of the present invention.

Figure 3:
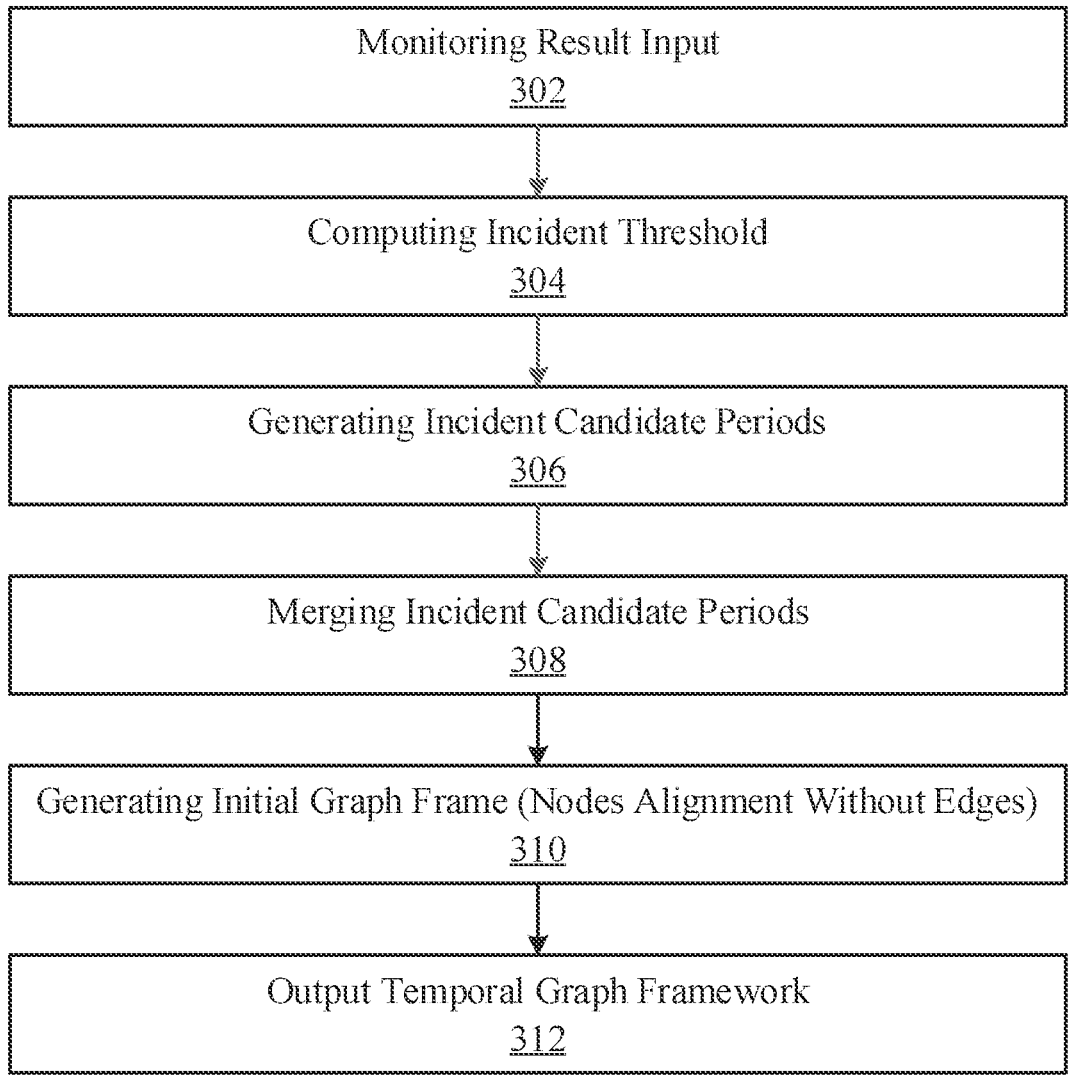
FIG. 3 is a diagram illustratively depicting a method for temporal graph generation within a Temporal Graph-based Incident Analysis System (TGIAS), in accordance with embodiments of the present invention.

Referring now to FIG. 3, a diagram showing a method 300 for temporal graph generation within a Temporal Graph-based Incident Analysis System (TGIAS), is illustratively depicted in accordance with embodiments of the present invention.

In accordance with embodiments of the present invention, the method 300 can detect incidents within a cyber-physical system (CPS), which can include system-level abnormal events that involve multiple sensors.

In block 302, the present invention can monitor results, using TGIAS, during a normal operational period to establish a baseline of abnormal sensor activity. It can maintain the maximum number/amount of abnormal sensors detected during this period to use as a reference. In block 304, an incident threshold can be determined by $\delta_i=(1+\alpha)^*\max$ (abnormal sensor), where $\alpha$ is a safe buffer and can be set at, for example, 20% in real applications. This threshold serves to discern between normal fluctuations and actual incidents by establishing a baseline of expected sensor anomalies. Upon establishing this threshold, the method 300 can proceed to block 306 where it applies the computed threshold across all detection results to generate candidate periods of incident. A candidate period, T_i={start_i, end_i} can includes a start and end timestamp, demarcating a window of potential incident activity. Next, in block 308, TGIAS can sequentially scan these candidate periods, comparing each to the pre-defined threshold. If consecutive periods exceed this threshold, TGIAS can merge them into a single incident period, ensuring continuity and relevance of the detected incidents, in accordance with aspects of the present invention. More specifically, if T_i and T_i+1 are comparatively sufficiently close to each other (e.g., (start_i+1−end_i)<$\delta$_t, where $\delta$_t represents a pre-defined threshold for a particular time period t, TGIAS can merge T_i and $\overline{T}$_i+1, in accordance with aspects of the present invention.

In some embodiments, the method 300 can include generating a set of candidate periods by selecting the periods with higher score than the threshold. Then, TGIAS can merge these candidates and generate a single incident period in block 306. After the incident period is detected, TGIAS can retrieve all the sensors that have abnormal signals and align them by time. In this step, the system can use the information of different types of anomalies (e.g., which can be Matrices) and record in a table for further use.

In some embodiments, after identifying the incident period, block 310 can include retrieving all sensors that have reported abnormal signals during this period. The present invention can align these sensors by the time of their first detected anomaly, thus organizing the data into a temporal framework. This step employs different types of anomalies, and records them in a table for subsequent analysis. The sensor nodes within this framework can be arranged along the x-axis according to the timing of their anomalies. It's important to note that at this stage, the graph can consist solely of nodes without any connecting edges, hence it can be viewed as, and termed a "temporal graph framework", in accordance with aspects of the present invention. In block 312, the temporal graph framework can be output, and can include sensor nodes which are aligned by the time of the first anomaly during the incident period. The x-axis can represent the time, and the start and end points can represent the start and end timestamps of the incident period. The interval of the sensor nodes can correspond to the time interval of their anomalies, and detailed information regarding the anomalies can be recorded and stored for later use (e.g., in a table), in accordance with aspects of the present invention.

This method 300 can ensure that the incident timeline graph accurately reflects the temporal sequence of anomalies, allowing for precise tracking and analysis of incidents within the CPS by the system. It can form the basis for further analysis, such as anomaly severity ranking and causality reasoning, providing effective management, troubleshooting, and maintenance of the system in real-time, in accordance with aspects of the present invention.

Figure 4:
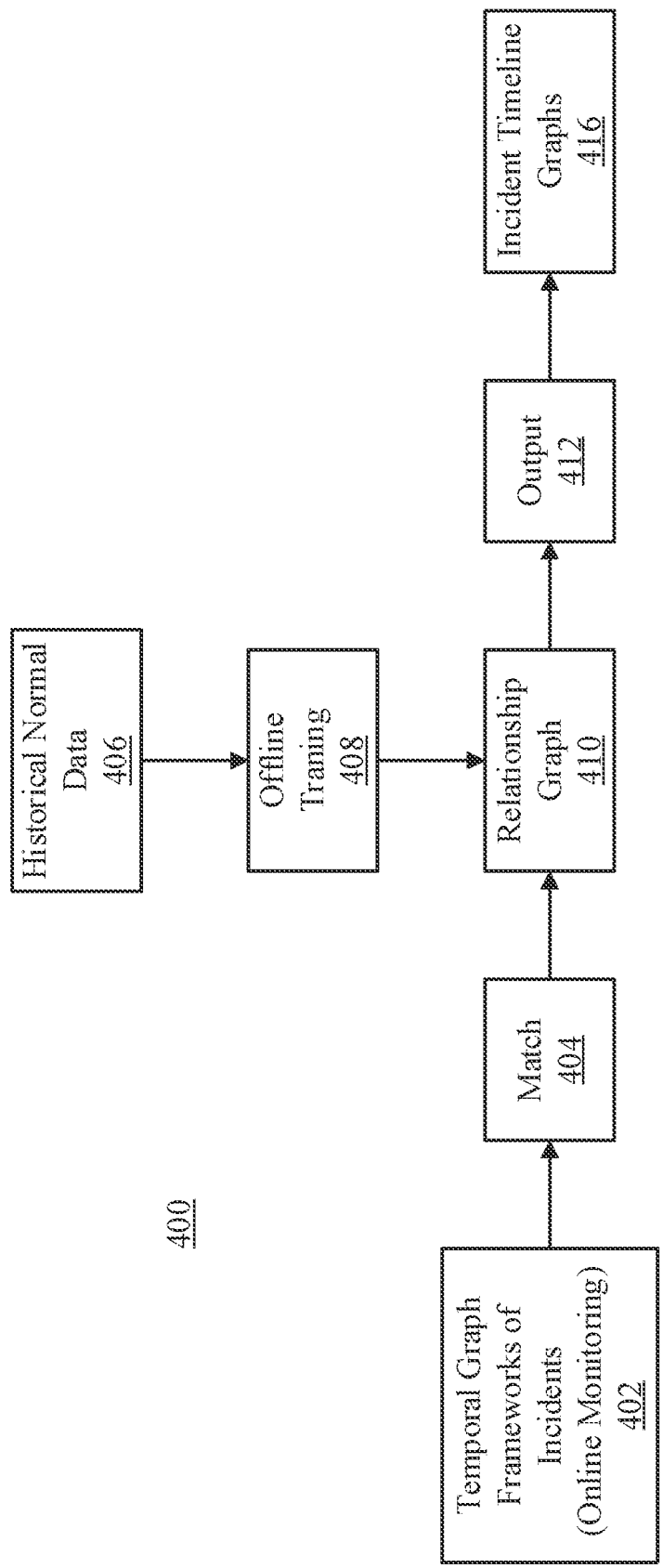
FIG. 4 is a diagram illustratively depicting a method for generating an incident timeline graph, in accordance with embodiments of the present invention.

Referring now to FIG. 4, a diagram showing a method 400 for generating an incident timeline graph is illustratively depicted in accordance with embodiments of the present invention.

In various embodiments, incident timeline graphs can be generated by integrating the relationship graph of sensors and the temporal graph framework of incidents. The relationship graph can include relationship edges for all the sensors. As an illustrative example, denote the sensor set as S. For each incident, there is a temporal graph framework that can include abnormal sensor set S_i, where S_ is a subset of S. In this step, TGIAS can match S_i to relationship graph G, and can retrieve all the edges related to S_i. The edges can then be added to the framework and integrated as the incident timeline graph G_i, in accordance with aspects of the present invention.

In some embodiments, incidents can be identified by TGIAS by generating a threshold to evaluate the monitoring results. Once this threshold is established, it can be applied to the detection results to generate candidate periods for incidents. These candidate periods can contain abnormal sensor data, which can then be used to construct the temporal graph frameworks. These frameworks can align the abnormal sensor data by time, providing the structure necessary to match with the sensor relationship graph, and produce the incident timeline graphs in block 416. The temporal graph frameworks of incidents can be generated by and during the process of monitoring and evaluating the sensor data in real-time or near real-time, in accordance with aspects of the present invention.

In some embodiments, in block 402, TGIAS takes temporal graph frameworks of incidents from online monitoring as input. These frameworks provide a structured approach to aligning sensor data based on the time of detection of anomalies, without yet establishing relationships between the sensors. Block 404 involves matching the temporal graph frameworks with the relationship graph developed through historical data analysis. This relationship graph, represented in block 410, contains edges that depict the relationships among sensors, denoted by the set S. For each incident, the system focuses on a subset of this set, identified as S-i, which includes only the sensors that have reported anomalies. During the matching process, TGIAS retrieves all the relationship edges related to S-i from the relationship graph and integrates them into the temporal graph framework, thus creating a connected incident timeline graph, noted as G_i.

Historical normal data, shown in block 406, is used in conjunction with offline training, in block 408, to develop and refine the relationship graph. This graph can be utilized for detecting and understanding the normal interactions and dependencies between sensors, which can be then juxtaposed with the detected anomalies to ascertain deviations from the expected sensor behavior. After the integration in block 404, the incident timeline graphs can be produced in block 416. These graphs illustrate the temporal relationship of anomalies and the interconnectedness of sensors, with the interval between nodes on the x-axis indicating the time differences between the anomalies.

In various embodiments, the system can output the fully formed incident timeline graph in block 412. This output serves as a basis for further analysis, such as root cause reasoning. The incident timeline graph becomes a comprehensive model that not only shows the temporal sequence of anomalies but also the potential causal relationships between them. The last analytical step involves root cause reasoning, where the present invention can utilize TGIAS and employ a graph diffusion algorithm to trace back the anomaly expansion and influence in reverse time. This can identify which sensors (e.g., the preceding nodes) are most likely to have caused the most significant damage to others, a critical step in mitigating the impact of the anomalies and preventing future incidents, in accordance with aspects of the present invention.

Figure 5:
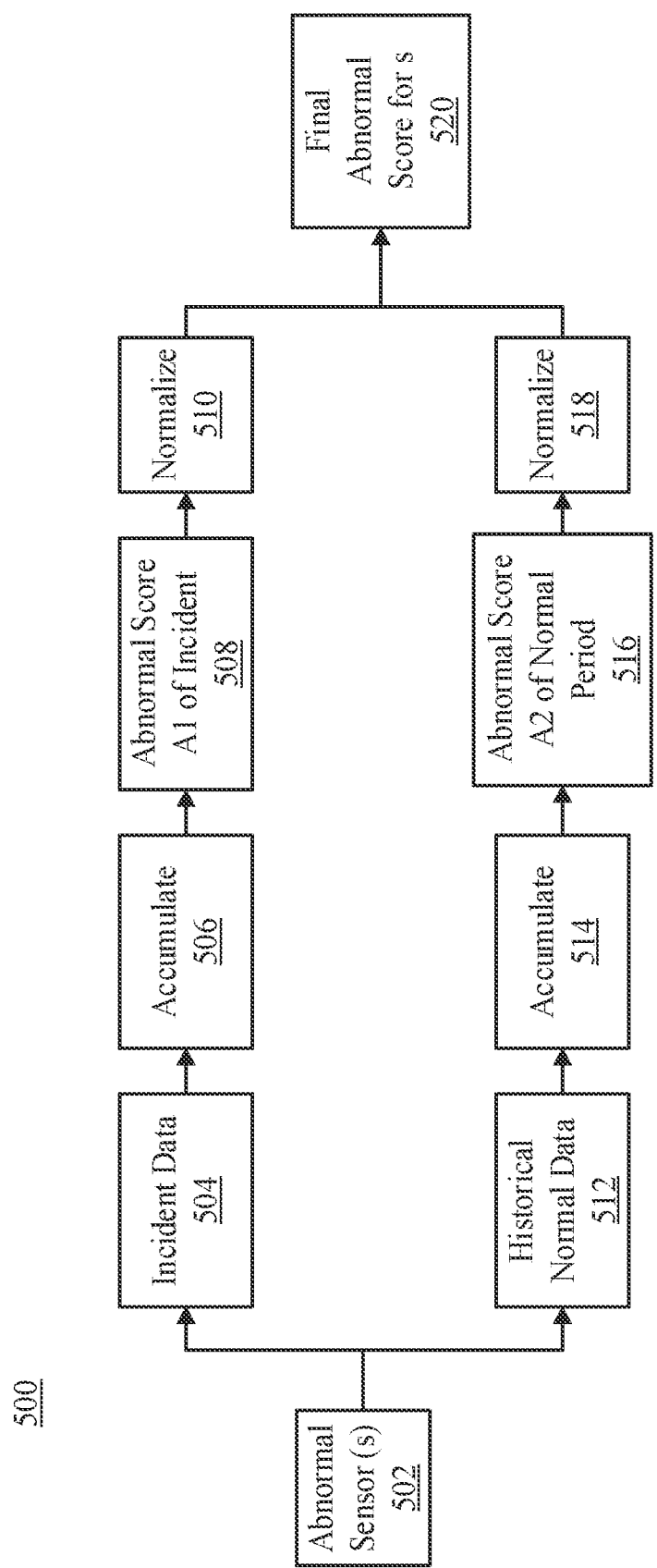
FIG. 5 is a diagram illustratively depicting a method for anomaly severity ranking with an incident timeline graph, in accordance with embodiments of the present invention.

Referring now to FIG. 5, a diagram showing a method 500 for anomaly severity ranking with an incident timeline graph is illustratively depicted in accordance with embodiments of the present invention.

In various embodiments, in block 502, abnormal sensors can be identified by TGIAS during a particular incident or incidents. These sensors are the starting point for determining the severity of anomalies that occurred during the incident period. Proceeding to block 504, TGIAS collects incident data related to the identified abnormal sensors. This data encapsulates the strength and duration of the anomalies exhibited by each sensor during the incident period. In block 506, the anomaly strength from the incident data is accumulated. This accumulation, represented as A1, takes into account the length of time each sensor was in an anomalous state and the significance of the anomaly's signal during the incident period. Block 508 then computes the abnormal score A1 for the incident period, which reflects the accumulated anomaly strength for each sensor. This score can be later used to determine the relative severity of the incident-related anomalies, in accordance with aspects of the present invention.

In some embodiments, block 510 can normalize the abnormal score A1 by considering the historical behavior of the sensors during normal operating periods. This normalization accounts for any false positives that may occur when the system is functioning normally, ensuring that the final severity score is not skewed by aberrant but non-critical readings. Concurrently, block 512 can utilize historical normal data to establish a baseline of sensor behavior. TGIAS accumulates this data in block 514 to generate an abnormal score A2, representing the anomaly strength during normal operation periods, which might include false positives. Block 516 computes the abnormal score A2 for the normal period, and block 518 normalizes this score to create a fair comparison between the anomalies detected during the incident and normal periods, in accordance with aspects of the present invention In various embodiments, block 520 can output the final abnormal score for each sensor, which can be the normalized score considering both the incident period (A1) and the normal period (A2). TGIAS can output the top k sensors with the highest anomaly scores based on significant and prolonged anomalous activity during the system alert period and minimal false positives during normal operation. The incident timeline graph can be then combined with the severity scores, transforming it into an integrated model that represents both the sensor relationships and the severity of each sensor over time. The nodes in the graph represent the sensors, and the edges represent the relationships between them, with weights indicating the severity of anomalies and the relevance of sensor relationships. This integrated approach provides a comprehensive view of the anomaly severity within the CPS, allowing for targeted troubleshooting, monitoring, and corrective maintenance efforts (e.g., automatic and/or end user assisted), in accordance with aspects of the present invention.

Figure 6:
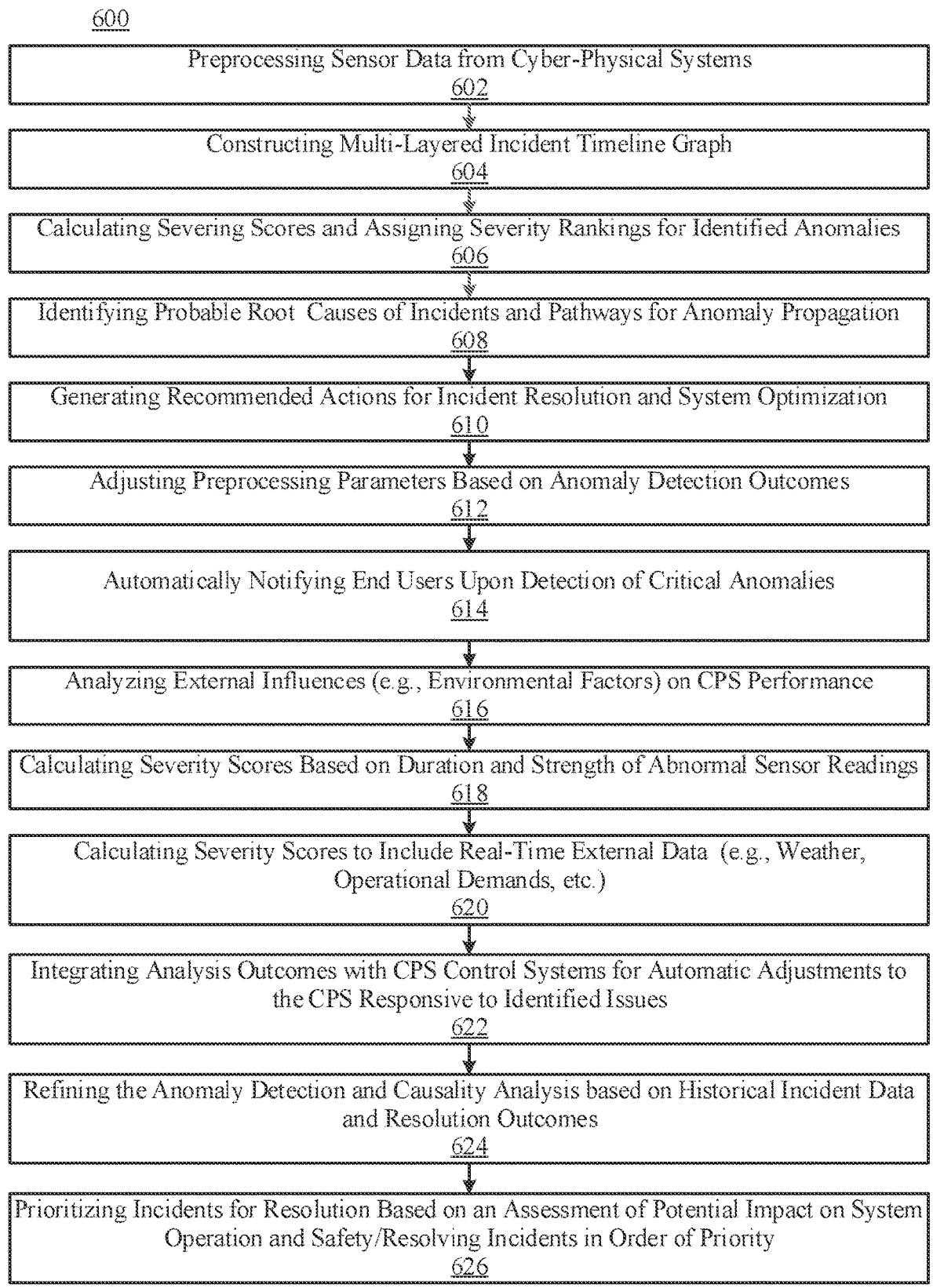
FIG. 6 is a block/flow diagram illustratively depicting a method for incident analysis and correction in Cyber Physical Systems (CPS), in accordance with embodiments of the present invention.

Referring now to FIG. 6, a block/flow diagram showing a method 600 for incident analysis and correction in Cyber Physical Systems (CPS) is illustratively depicted in accordance with embodiments of the present invention.

In some embodiments, in block 602, the method 600 can begin with the preprocessing of dynamically gathered multimodal data from a distributed network of sensors across the Cyber-Physical System (CPS). This preprocessing can include identifying abnormal sensor readings that are indicative of potential incidents. Such preprocessing is executed by a processor equipped to handle the complex data environment of CPS. In block 604, a multi-layered incident timeline graph can be constructed. This graph represents the relationships between abnormal sensor readings, specific CPS components, and the temporal sequencing of events. The construction of this graph utilizes machine learning algorithms for anomaly detection, and graph-based modeling techniques are employed to map the intricate interactions and dependencies among system components and sensor data.

In some embodiments, severity scores are calculated and severity rankings are assigned to identified anomalies by the processor in block 606. The severity scores can be based on a composite index which can include the potential impact on CPS operation, a comparison with historical incident data, and predictive risk assessments. This scoring system ensures that anomalies are evaluated comprehensively, taking into account various factors that affect the CPS's functionality and integrity. Proceeding to block 608, the method can identify probable root causes of incidents and pathways for anomaly propagation through the CPS. This can be achieved using causal inference algorithms applied to the incident timeline graph, which detect underlying vulnerabilities and predict potential future system weaknesses. This block is important for pinpointing the origin of issues within the CPS and for strategizing on how to bolster the system against similar incidents in the future.

In various embodiments, in block 610, recommended actions can be generated and/or executed automatically by the system for incident resolution and system optimization. These recommendations can be generated based on the analysis performed in the previous steps and can be specifically tailored to address the specific incidents and anomalies identified. The user interface can be configured for displaying these recommended actions and initiating the execution of incident resolution and system optimization tasks, providing a direct pathway from analysis to action, in accordance with aspects of the present invention.

In various embodiments, the method can further include adjusting preprocessing parameters based on feedback from anomaly detection outcomes, enhancing the accuracy of anomaly identification in subsequent analyses in block 612. In block 614, the method includes a feature for automatically notifying maintenance teams via electronic messaging about critical anomalies, which aids in prompt and effective remediation efforts. Block 616 shows the integration of environmental factors in the analysis, allowing the system to evaluate external influences on CPS performance and incident causation. At block 618, the severity scores can be calculated based on the duration and strength of the abnormal sensor readings, further refining the incident analysis process. Block 620 accounts for real-time external data such as weather conditions and operational demands in severity ranking calculations to provide a more nuanced assessment of anomaly impact. Block 622 involves the integration of analysis outcomes with CPS control systems, enabling automatic adjustments to the CPS in response to identified issues.

In block 624, machine learning can be utilized to refine the anomaly detection and causality analysis based on accumulated historical incident data and resolution outcomes. In block 626, the method can include prioritizing incidents for resolution based on an assessment of their potential impact on system operation and safety. This can involve evaluating each incident not only by the severity of the anomaly but also by the extent to which it affects critical system operations and safety measures. The prioritization process ensures that resources are allocated effectively, and that the most critical issues are addressed with urgency to maintain the reliability and safety of the CPS. This process can leverage insights from the multi-layered incident timeline graph and severity rankings to determine the order in which incidents should be addressed. In practice, this proactive approach greatly minimizes downtime and prevents minor incidents from escalating into major system disruptions, in accordance with aspects of the present invention.

Figure 7:
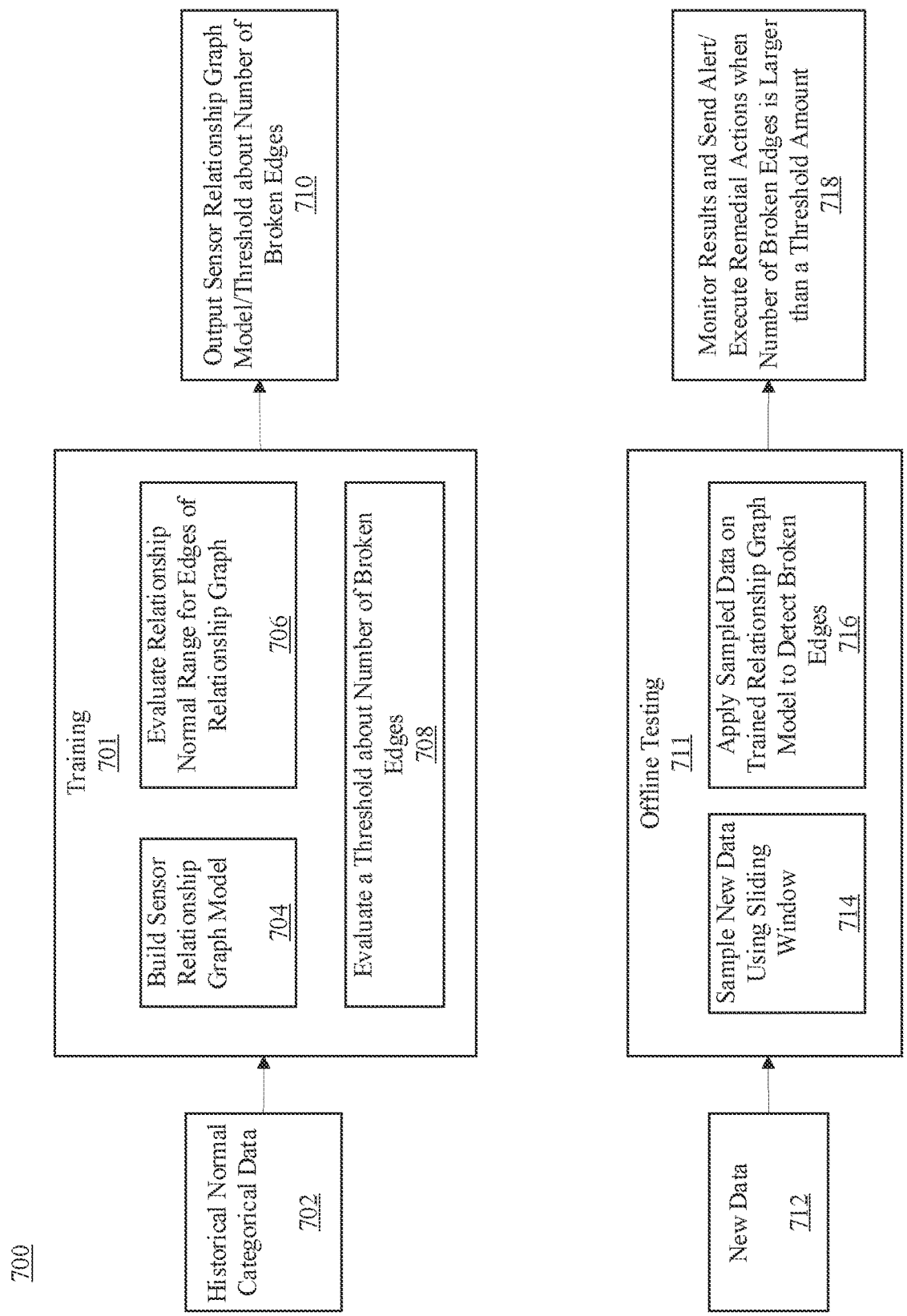
FIG. 7 is a diagram illustratively depicting a system and method for Transition Based Categorical Anomaly Detection (TCAD) for Cyber-Physical Systems (CPS), in accordance with embodiments of the present invention.

Referring now to FIG. 7, a diagram showing a system and method 700 for Transition Based Categorical Anomaly Detection (TCAD) for Cyber-Physical Systems (CPS) is illustratively depicted in accordance with embodiments of the present invention.

In some embodiments, in block 702, historical normal categorical data can be collected and/or received to serve as the baseline for normal sensor behavior within the CPS. This data encompasses typical operational readings from various sensors and establishes a pattern of normalcy against which anomalies can be detected. Proceeding to block 704, a sensor relationship graph model can be constructed. This model is important for utilization, as it maps the network of sensor interactions and dependencies based on their categorical data transitions, offering a structural understanding of the CPS under normal operating conditions.

At block 706, the relationship normal range for edges of the relationship graph can be evaluated. This step can include determining the typical range of sensor readings and their transitions to identify what constitutes a deviation or an anomaly within the system. Block 708 involves evaluating a threshold about the number of broken edges, which pertains to identifying when the interactions between sensors become irregular or cease to function as expected, indicating potential anomalies or system malfunctions. In block 710, the sensor relationship graph model and the threshold about the number of broken edges can be output, and this output can be used as a reference point for detecting and diagnosing anomalies within the CPS, in accordance with aspects of the present invention.

In some embodiments, in an offline testing phase starting with block 711, new data can be sampled using a sliding window approach in block 714, which enables the continuous monitoring and analysis of sensor data as it is collected in real-time. Block 716 can then apply the sampled data on the trained relationship graph model to detect broken edges by assessing current sensor data against the model to identify any irregularities or signs of system issues. Block 718 represents the monitoring results and the action of sending alerts or executing remedial actions when the number/ amount of broken edges is larger than the threshold amount. This step ensures that any potential issues are promptly communicated to system operators for immediate attention and/or automatically addressed and corrected by the system, thereby maintaining and improving the integrity and performance of the CPS, in accordance with aspects of the present invention.

Figure 8:
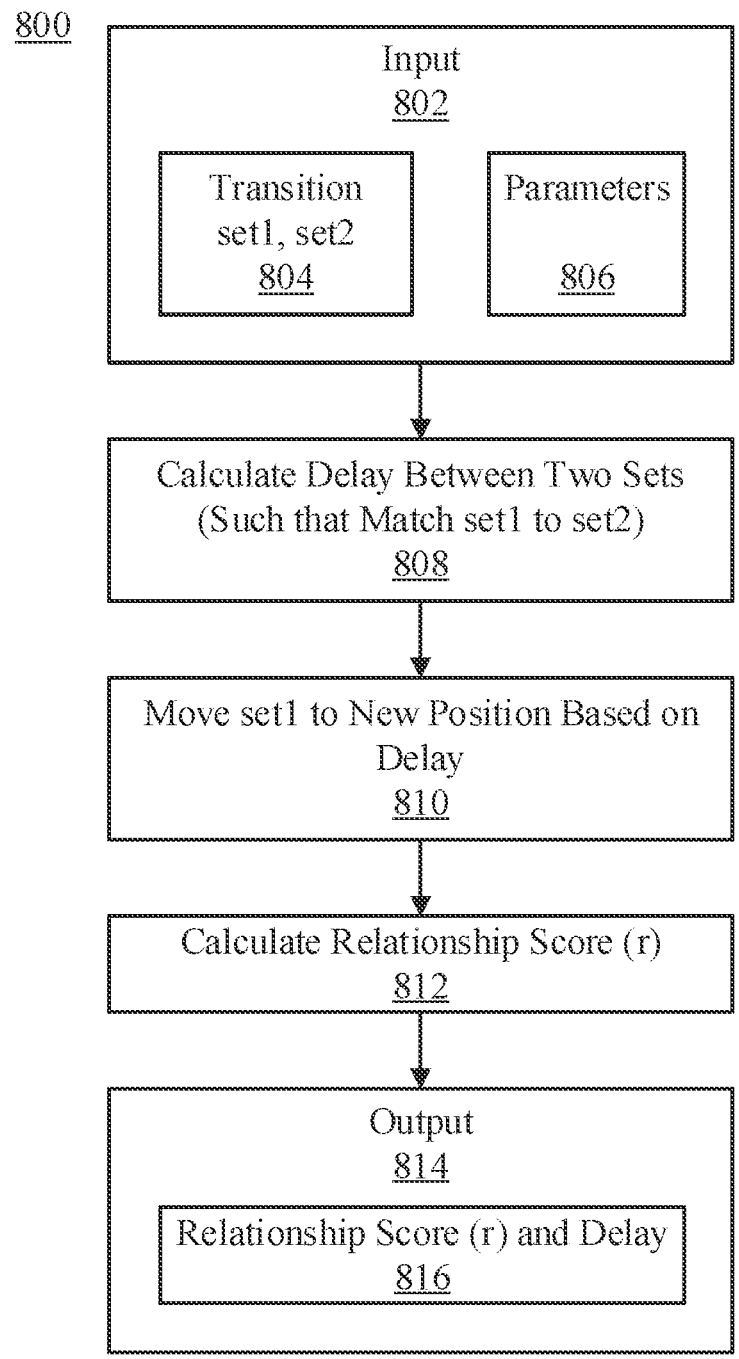
FIG. 8 is a diagram illustratively depicting a method for determining relationships between sensors using Transition Based Categorical Anomaly Detection (TCAD) for Cyber-Physical Systems (CPS), in accordance with aspects of the present invention.

Referring now to FIG. 8, a diagram showing a method 800 for determining relationships between sensors using Transition Based Categorical Anomaly Detection (TCAD) for Cyber-Physical Systems (CPS) is illustratively depicted in accordance with embodiments of the present invention.

In various embodiments, in block 802, input can be collected and/or received, and can include, for example, historical normal categorical data from a multitude of sensors within the CPS. These sensors could range from temperature sensors in a building to pressure sensors in a vehicle, providing a diverse set of data points indicative of the operational state of the system. Transition sets, depicted in block 804, can then be automatically generated for each sensor based on the received historical data. These transition sets represent the categorical state transitions for each sensor, detailing how sensor outputs change over time. In block 806, parameters can be configured to facilitate the detection process. These parameters can include thresholds for transition point detection and relationship score calculations, which can be utilized for accurate anomaly detection, in accordance with aspects of the present invention.

In block 808, delay between two sets of transitions can be calculated by, for example, matching set1 to set2, identifying a time offset between similar events or states recorded by different sensors, which can be effectively utilized for temporal analysis. Moving set1 to a new position based on the delay, as shown in block 810, can align the data from different sensors temporally. This step is important for understanding the sequence of events across the CPS and identifying any delays that might signify system inefficiencies or malfunctions. Block 812 involves calculating a relationship score (r) for each edge in the sensor relationship graph model. The relationship score quantifies the strength of the relationship between sensor pairs, can be utilized for identifying which sensor interactions deviate from the established normal ranges.

In various embodiments, the output, represented in block 814, can be viewed as the culmination of the detection process, generating and presenting a determined relationship score and a delay. The relationship score can be utilized for determining which edges, or sensor interactions, may be broken or indicative of an anomaly within the CPS. Block 816 showcases the output of relationship score (r) and delay, which can trigger an alert and/or an automatic corrective action or actions if anomalies are detected. This output is important for utilization for immediate, real-time response and intervention, ensuring the CPS can quickly return to normal operational parameters or undergo maintenance if necessary, for various CPS systems, including any type of vehicle, building, or components thereof to provide robust and real-time anomaly detection and system management (including corrective actions) in a diverse, real-world CPS environment, in accordance with aspects of the present invention.

Figure 9:
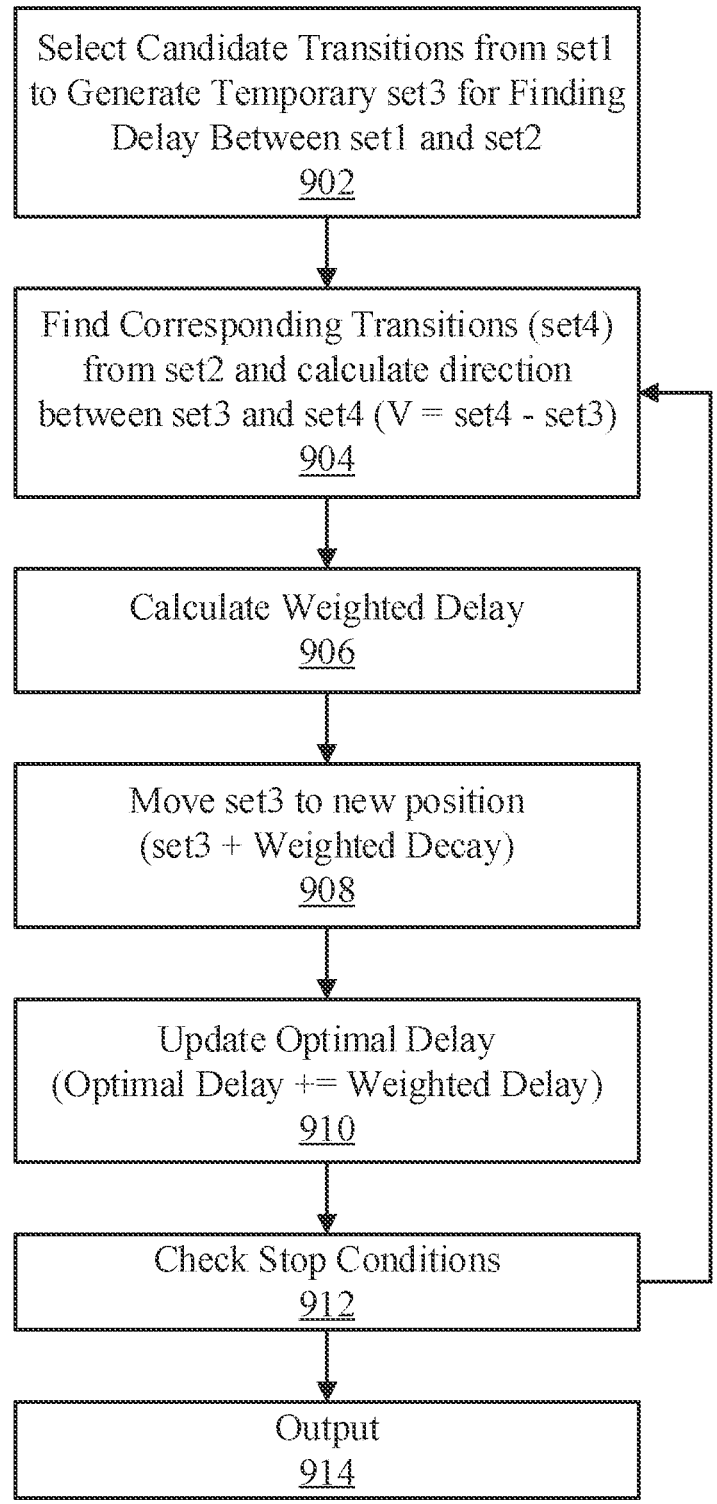
FIG. 9 is a diagram illustratively depicting a method for determining delay between sets of transition data in Transition Based Categorical Anomaly Detection (TCAD) for Cyber-Physical Systems (CPS), in accordance with embodiments of the present invention.

Referring now to FIG. 9, a diagram showing a method 900 for determining delay between sets of transition data in Transition Based Categorical Anomaly Detection (TCAD) for Cyber-Physical Systems (CPS) is illustratively depicted in accordance with embodiments of the present invention.

In various embodiments, in block 902, candidate transition points can be selected from a source transition set (set1) to generate a temporary transition set (set3). This set can be used for finding the delay between the source set and a reference set (set2), which contains corresponding transition points. Moving to block 904, the method can include finding corresponding transitions from set2 and calculating the direction vector between set3 and set4 (V=set4−set3). For each point in set3, the algorithm can match the closest point in set2 to estimate the direction of the delay. At block 906, the method can calculate a weighted delay. This step can involve using a Gaussian kernel function to reduce the influence of outliers in the data, ensuring that the delay calculation is robust and less affected by anomalous data points, in accordance with aspects of the present invention.

In some embodiments, a weighted delay can be calculated in block 906 by utilizing a Gaussian kernel function to reduce the influence of outliers in the data, ensuring that the delay calculation is robust and less affected by anomalous data points. In block 908, set3 can be moved to a new position based on the weighted delay (set3+Weighted Decay). This repositioning aligns the transitions in set3 with those in set4, reflecting the calculated delay. In block 910, the method can update the optimal delay by adjusting the optimal delay by the weighted delay, incrementally improving the alignment between the two sets of transitions as the algorithm iterates through the data. Block 912 can include checking stop conditions, which can determine when the algorithm has sufficiently aligned the two sets of transitions, signifying that the delay calculation can be concluded.

In some embodiments, in block 914, the relationship score and delay can be output. The relationship score quantifies the strength of the correlation between the two sets of transitions after accounting for the calculated delay. If this score is above a predetermined threshold, it can be inferred that there is a significant relationship between the sensors represented by set1 and set2. This output is important for identifying and understanding the temporal relationships between various sensors in the CPS, thereby facilitating effective anomaly detection, system monitoring, and performing corrective actions, in accordance with aspects of the present invention.

Figure 10:
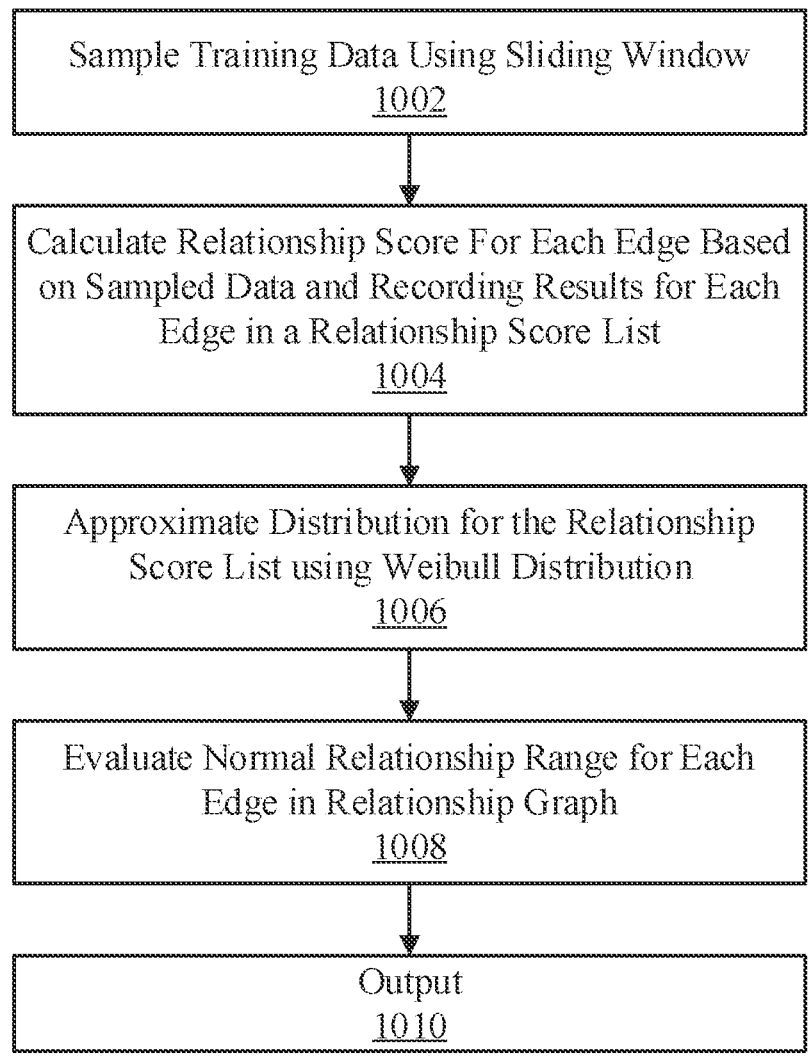
FIG. 10 is a diagram illustratively depicting a method for evaluating relationship normal range for edges of a relationship graph for anomaly detection using Transition Based Categorical Anomaly Detection (TCAD), in accordance with embodiments of the present invention.

Referring now to FIG. 10, a diagram showing a method 1000 for evaluating relationship normal range for edges of a relationship graph for anomaly detection using Transition Based Categorical Anomaly Detection (TCAD) is illustratively depicted in accordance with embodiments of the present invention.

In various embodiments, in block 1002, the method can sample training data using a sliding window technique which can capture time-sequential data from sensors within the Cyber-Physical System (CPS) (e.g., automobiles, buses, trains, ships, airplanes, school building, office building, factory, etc.), which can be used to identify normal operational patterns and transitions for each sensor. In block 1002, with the training data present, the system can calculate a relationship score for each edge in the sensor relationship graph model. Each edge corresponds to a pair of sensors and the score represents the strength of their relationship based on the transition data captured. The scoring is meticulously recorded for each edge, providing a comprehensive overview of the sensor network's health within the CPS.

In block 1006, the relationship score list can be analyzed to approximate the distribution for the relationship scores using the Weibull distribution (or similar). This statistical method can be utilized to model the behavior of the relationship scores, enabling the identification of outliers that deviate from the established pattern. This advanced statistical method can be instrumental in characterizing the behavior of the sensor relationships, which is particularly effective for the diverse types of sensors found in different CPS applications, such as detecting air quality in vehicles or monitoring energy usage in buildings. In block 1008, a normal relationship range for each edge in the relationship graph can be evaluated using the derived Weibull distribution. This step is important for setting the standard for what is considered normal sensor behavior, against which anomalies can be contrasted, in accordance with aspects of the present invention.

In various embodiments, in block 1010, final output from the system provides the evaluated normal relationship ranges and the corresponding thresholds. When these thresholds are crossed, it indicates a potential anomaly. The system and method of the present invention can function across any type of CPS where sensor data is used (e.g., for operational monitoring and control). The present invention has capability to adapt to any of a plurality of types of CPS environments, and such versatility allows it to provide real-time monitoring and corrective action across a range of platforms (e.g., from transportation vehicles to educational institutions), ensuring safety, efficiency, and optimal performance of these complex systems. Thus, while the diagram illustrates specific applications like vehicles and buildings, it is to be appreciated that the TCAD system's application is not limited to these examples and can extend to any CPS with sensor networks, in accordance with aspects of the present invention.

Figure 11:
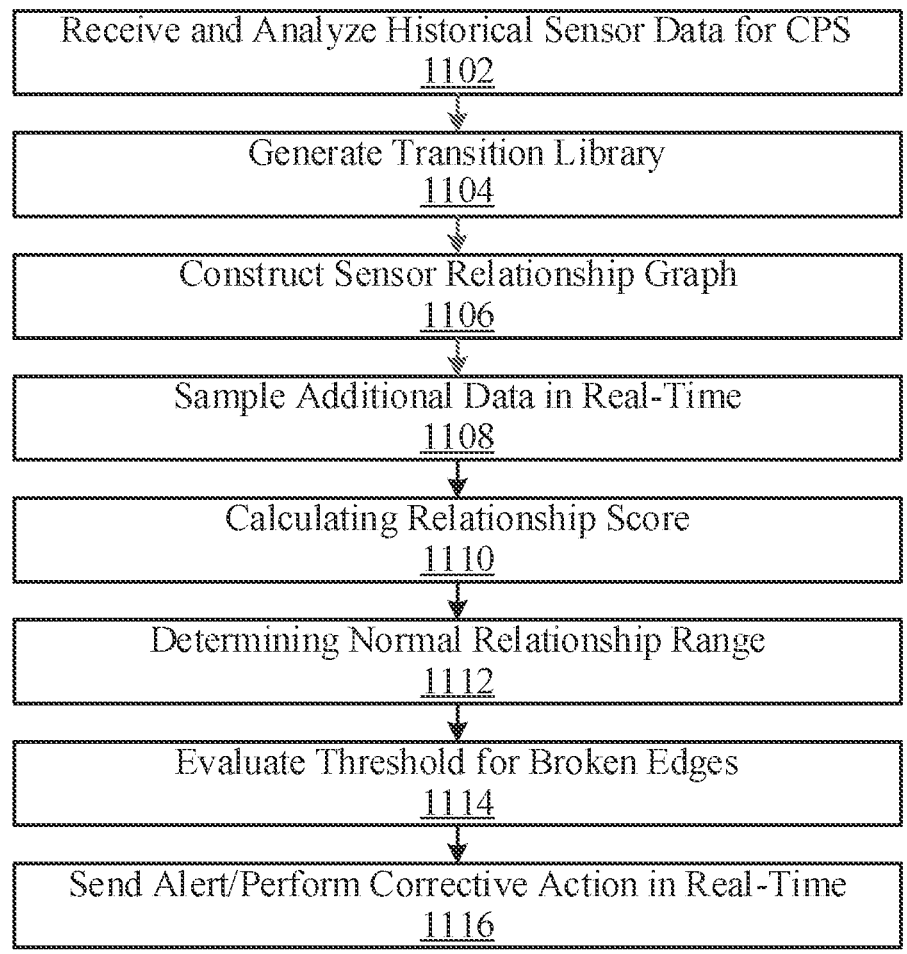
FIG. 11 is a block/flow diagram illustratively depicting a method for anomaly detection and correction using Transition Based Categorical Anomaly Detection (TCAD), in accordance with embodiments of the present invention.

Referring now to FIG. 11, a block/flow diagram showing a method 1100 for anomaly detection and correction using Transition Based Categorical Anomaly Detection (TCAD) is illustratively depicted in accordance with embodiments of the present invention.

In some embodiments, in block 1102, historical normal categorical data can be received from a plurality of sensors within the CPS and analyzed. This historical data can form the foundational baseline from which anomalies will be detected, and can include various categorical states that the sensors can report during normal operation. In block 1104, following data reception in block 1102, an automatic generation of a transition library for each sensor can be performed based on the received data. This library represents categorical state transitions for the sensor, documenting how each sensor's output changes from one state to another over time, which is important in understanding normal sensor behavior. In block 1106, a sensor relationship graph can be constructed by utilizing the identified transition points from the transition library 1104. Each edge of this graph represents a transition relationship between a pair of sensors, illustrating how the state changes of one sensor correlate with the state changes of another, in accordance with aspects of the present invention.

In various embodiments, in block 1108, with the model in place, additional sensor data can be sampled using a sliding window technique. This technique allows for real-time data analysis and the capture of recent sensor activity, providing a continuous stream of data for evaluation against the established model. In block 1110, for each edge of the graph model, a relationship score can be calculated based on the newly sampled data. These scores can show quantitative measures of the strength of the relationship between sensor pairs and are used to detect deviations from the norm. In block 1112, a normal relationship range for each edge can then be determined using a Weibull distribution. This statistical method can be utilized for setting the boundaries of normal behavior for each relationship, allowing for the identification of outliers which could signal potential issues, in accordance with aspects of the present invention.

In some embodiments, in block 1114, a threshold can be evaluated for the number of broken edges in the relationship graph model. A broken edge is an indicator of a potential anomaly and can be identified when a relationship score falls outside the normal range. In block 1116, an alert can be sent and/or corrective actions (e.g., automatic or manual) can be performed if the number of broken edges is determined to exceed an evaluated threshold level upon detection of a probable anomaly, prompting further investigation or immediate corrective action. The method 1100 detects anomalies in a CPS using the principles of TCAD by systematically assessing sensor data against a model of expected behavior to provide comparatively early detection of potential issues, enabling proactive maintenance and system management, in accordance with aspects of the present invention.

Figure 12:
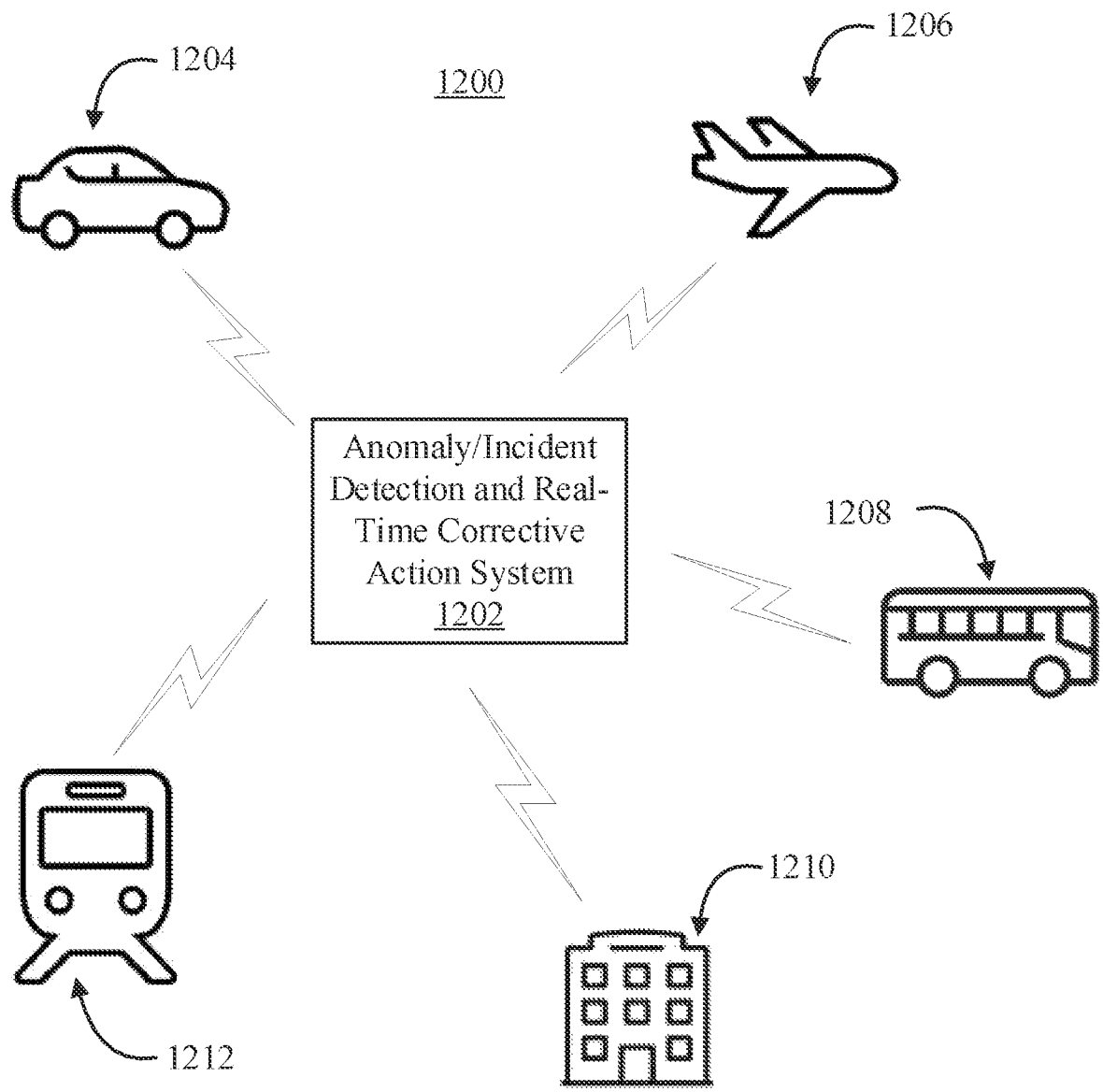
FIG. 12 is a block diagram illustratively depicting a system for integrated Cyber-Physical System (CPS) monitoring including an anomaly/incident detection and corrective action network for a plurality of functions of vehicles and buildings, in accordance with embodiments of the present invention.

Referring now to FIG. 12, a diagram showing a high-level view of an exemplary system and method 1200 for integrated incident/anomaly detection and correction for Cyber-Physical Systems (CPS) using a Temporal Graph-based Incident Analysis System (TGIAS) and/or Transition Based Categorical Anomaly Detection (TCAD), including controlling various vehicle and building systems, is illustratively depicted in accordance with embodiments of the present invention.

In various embodiments, block 1202 can include an integrated Anomaly/Incident Detection and Real-Time Corrective Action System, configured to service a multitude of Cyber-Physical Systems (CPS), including but not limited to structures and vehicles. This system, serving as a core of the integrated solution, can incorporate Transition Based Categorical Anomaly Detection (TCAD) and/or Temporal Graph based Incident Analysis System (TGIAS) to monitor, analyze, and respond to operational anomalies in real-time.

The system 1202 can utilize both historical sensor data and real-time inputs to detect anomalies and incidents across a range of connected entities. It can employ a sophisticated relationship graph model that comprehensively understands normal operational parameters and can detect deviations signaling potential hazards or system failures. For anomaly detection, the system 1202 can apply statistical models, such as the Weibull distribution, to establish normal operational ranges and threshold levels for incident identification. Furthermore, it can execute real-time corrective actions by interfacing with the control systems of the connected entities. For example, the system 1202 can adjust ventilation systems within vehicles to mitigate hazardous gas levels or modify energy consumption parameters in buildings for optimization and safety, in accordance with aspects of the present invention.

In various embodiments, specific, non-limiting examples of CPS that can be interfaced with the Anomaly/Incident Detection and Real-Time Corrective Action System 1202 can include an automobile 1204, airplane 1206, bus 1208, school building 1210, and a train 1212, noting that the system 1202 can be utilized for any type of CPS system, and the above types are presented for ease of illustration.

The automobile 1204 can be a personal vehicle equipped with a suite of sensors to monitor internal systems and environmental conditions. The system is designed to detect issues such as excessive CO or NOx emissions and initiate corrective actions such as altering fuel mixtures or engine parameters to reduce emissions and maintain air quality standards. The airplane 1206 can be representative of commercial aircraft systems where the integrated solution monitors parameters such as cabin pressure, air quality, and engine performance. Upon detection of any anomalies, the system can be configured to automatically make necessary adjustments to cabin pressure or to alert maintenance crews for further inspections and actions.

The bus 1208 can represent public transportation vehicles, where both passenger safety and vehicle performance are under continuous surveillance. The system can dynamically regulate HVAC systems upon detection of air quality issues or optimize routing based on real-time traffic conditions to enhance operational efficiency. The system 1202 can interact with systems in the school building 1210 (or any other type of building) ensures a safe and conducive learning (or working, recreation, etc.) environment by monitoring structural integrity, air quality, and energy efficiency. The system can autonomously control HVAC systems, initiate lockdown procedures, or optimize energy usage based on dynamic occupancy data. The train 1212, indicative of railway systems where safety and operational efficiency are of utmost importance. The system can adjust train operations, monitor track integrity, and ensure passenger comfort through environmental control systems, in accordance with aspects of the present invention.

In various embodiments, the unified and integrated approach to CPS management across diverse applications utilizes an advanced methodology where the interconnectivity of the system enhances operational safety and efficiency. By harnessing sophisticated data analysis and relationship modeling, the Anomaly/Incident Detection and Real-Time Corrective Action System 1202 can monitor and automatically maintain (e.g., perform corrective actions) various of modern infrastructure automatically, and can intelligently adapt to the unique operational demands of various entities to ensure their seamless and safe functioning, in accordance with aspects of the present invention.

Figure 13:
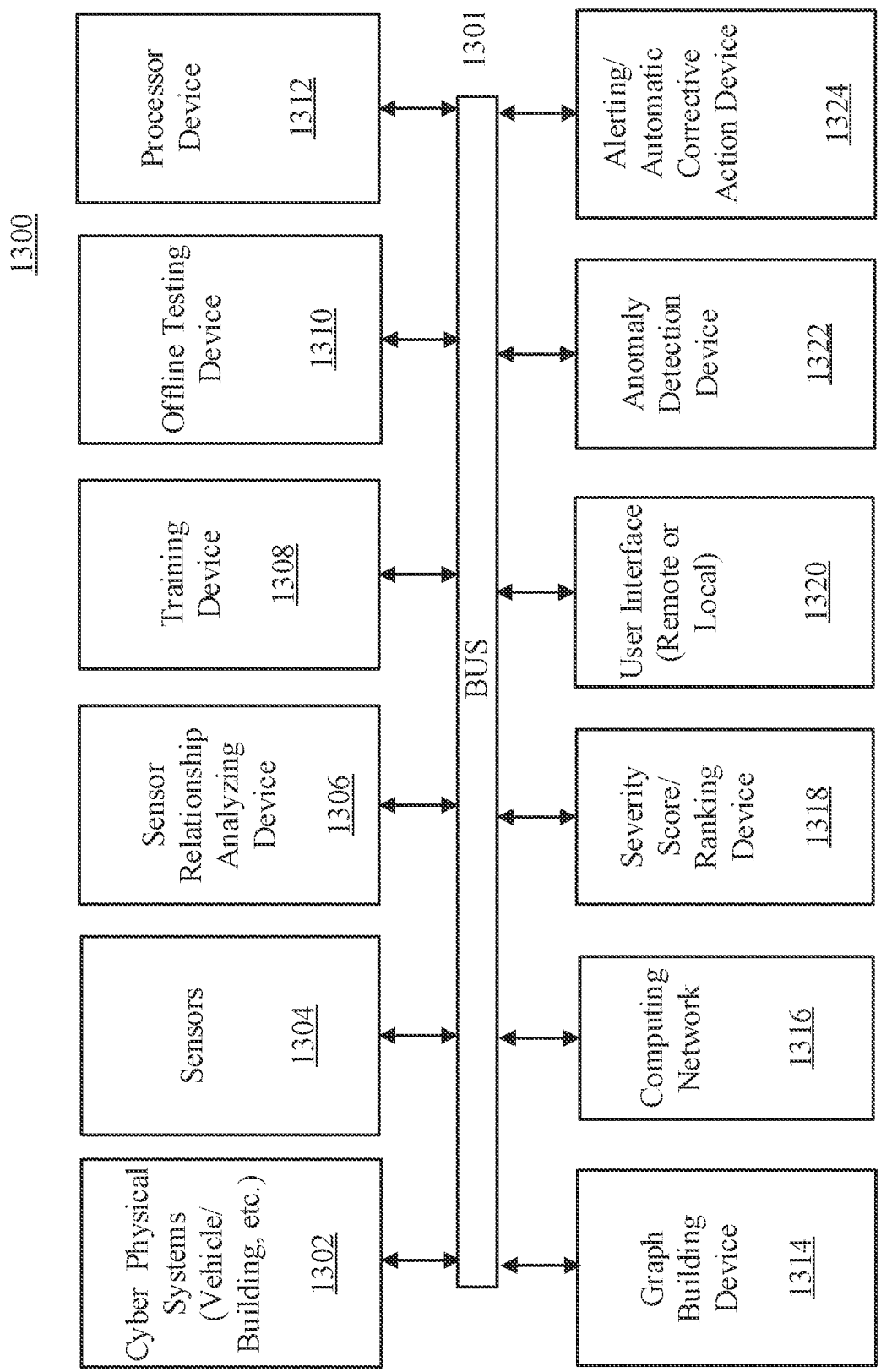
FIG. 13 is a diagram showing a high-level view of a system a method for anomaly detection and correction for Cyber-Physical Systems (CPS) using a Temporal Graph-based Incident Analysis System (TGIAS) and/or Transition Based Categorical Anomaly Detection (TCAD), in accordance with embodiments of the present invention.

Referring now to FIG. 13, a high-level view of a system 1300 for integrated incident/anomaly detection and correction for Cyber-Physical Systems (CPS) using a Temporal Graph-based Incident Analysis System (TGIAS) and/or Transition Based Categorical Anomaly Detection (TCAD) is illustratively depicted in accordance with embodiments of the present invention.

In various embodiments, in block 1302, CPS can be monitored and/or maintained (e.g., corrective actions taken) using TGIAS and/or TCAD using data collected and/or received from one or more sensors 1304. Block 1302 represents the CPS environment where the TGIAS/TCAD system is deployed, encompassing a variety of sensors and actuators embedded in physical infrastructures like vehicles or buildings. While the CPS 1302 is shown at a high level for the sakes of illustration and brevity, it is to be appreciated that the system can be applied to any sort of CPS systems, in accordance with aspects of the present invention. The sensors 1304 can collect data from the CPS environment to monitor its operational state and detect potential anomalies. In block 1306, a sensor relationship analyzing device can analyze the data from sensors to determine the relationships between different sensors and their data points, which is essential for identifying correlated events and potential root causes of anomalies.

A training device 1308 can utilize historical normal categorical data to build a sensor relationship graph model based on transition points, evaluate relationship normal ranges for each edge of the relationship graph model, and calculate a threshold about the number of broken edges. An offline testing device 1310 can utilize a sliding window similar (or identical) to the training step to sample new data, can apply sampled data on the trained relationship graph model for detecting broken edges, and can output monitoring results, raising an alert and suggesting corrective actions if the number of broken edges is larger than the threshold. A processor device (or devices) 1312 can be utilized as a computational unit for processing (e.g., data and coordinates activities) between various components of the system.

In various embodiments, a graph building device 1314 can construct a visual representation of the data and relationships determined by the system, utilized for analysis, interpretation, and understanding of various CPS states. A computing network 1316 facilitates distributed processing, connects the system to additional networks for broader data analysis and decision-making support, and can be utilized for remote and/or automated control (e.g., corrective actions controls) and monitoring of various CPS functions, using a user interface 1320, for any of a plurality of types of CPS. A severity score/ranking device 1318 can assess and rank severity of detected incidents, which can be utilized in, for example, prioritizing responses and resource allocation. An anomaly detection device 1322 can identify and flag deviations from normal operational patterns within a CPS, which can be indicative of potential threats or issues. An alerting/automatic corrective action device 1324 can be utilized to alert end users or to initiate corrective actions to mitigate and resolve incidents and anomalies, responsive to detected incidents or anomalies. The components can be interconnected through a Bus 1301, which can act as a common communication pathway for data and control signals. This infrastructure enables the system to autonomously monitor, analyze, and respond to anomalies, ensuring efficient and effective management of Cyber-Physical Systems, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope of the invention. Those skilled in the art could implement various other feature combinations without departing from the scope of the invention. Having thus described aspects of the invention, with the details and particularity required by the patent laws, what is claimed and desired protected by Letters Patent is set forth in the appended claims.

What is claimed is:

1. A method for incident analysis in Cyber-Physical Systems (CPS) using a Temporal Graph-based Incident Analysis System (TGIAS), comprising:
    preprocessing dynamically gathered multimodal data from a distributed network of sensors across the CPS, including identifying abnormal sensor readings indicative of potential incidents, by a processor;
    constructing a multi-layered incident timeline graph, representing abnormal sensor readings, relationships to specific CPS components, and temporal sequencing of events, utilizing machine learning for anomaly detection and graph-based modeling of complex interactions and dependencies among system components and sensor data by:
        determining nodes of the multi-layered incident timeline graph that are aligned on timelines that indicate when an incidental threshold, based on a safe buffer and a number of abnormal sensors, has been exceeded;
        determining a relationship of the nodes based on a generated relationship graph that establishes the relationship between sensors including the abnormal sensors:
    calculating severity scores and assigning severity rankings to identified anomalies by the processor, based on a composite index including potential impact on CPS operation, comparison with historical incident data, and predictive risk assessments;
    identifying probable root causes of incidents and pathways for anomaly propagation through the CPS using causal inference and the incident timeline graph to detect underlying vulnerabilities and predict potential future system weaknesses; and
    generating and executing recommended actions for incident resolution and system optimization including controlling an autonomous vehicle based on an optimized route generated based on real-time traffic conditions to enhance operational efficiency of the autonomous vehicle.

2. The method of claim 1, further comprising adjusting preprocessing parameters based on feedback from anomaly detection outcomes to improve accuracy of anomaly identification in subsequent analyses.

3. The method of claim 1, further comprising automatically notifying maintenance teams via electronic messaging about critical anomalies, including location, severity, and suggested corrective actions.

4. The method of claim 1, further comprising analyzing environmental factors in conjunction with sensor data to evaluate external influences on CPS performance and incident causation.

5. The method of claim 1, wherein the severity scores are calculated based on a duration and a strength of the abnormal sensor readings relative to a historical baseline.

6. The method of claim 1, wherein severity ranking calculations incorporate real-time external data, including weather conditions and operational demands, to enhance anomaly impact assessments.

7. The method of claim 1, further comprising integrating analysis outcomes with CPS control systems for automatic implementation of optimizations and preventative measures.

8. The method of claim 1, wherein the recommended actions include preventative measures and targeted recommendations for detected incidents, using a user interface configured for displaying and initiating execution of the recommended actions for incident resolution and system optimization.

9. A computer program product for incident analysis in Cyber-Physical Systems (CPS) using a Temporal Graph-based Incident Analysis System (TGIAS), the computer program product comprising a non-transitory computer readable storage medium having program instructions embodied therewith, the program instructions executable by a computer to cause the computer to perform a method comprising:
    preprocessing dynamically gathered multimodal data from a distributed network of sensors across the CPS, including identifying abnormal sensor readings indicative of potential incidents, by a processor;
    constructing a multi-layered incident timeline graph, representing abnormal sensor readings, relationships to specific CPS components, and temporal sequencing of events, utilizing machine learning for anomaly detection and graph-based modeling of complex interactions and dependencies among system components and sensor data by:
        determining nodes of the multi-layered incident timeline graph that are aligned on timelines that indicate when an incidental threshold, based on a safe buffer and a number of abnormal sensors, has been exceeded;
        determining a relationship of the nodes based on a generated relationship graph that establishes the relationship between sensors including the abnormal sensors;
    calculating severity scores and assigning severity rankings to identified anomalies by the processor, based on a composite index including potential impact on CPS operation, comparison with historical incident data, and predictive risk assessments;
    identifying probable root causes of incidents and pathways for anomaly propagation through the CPS using causal inference and the incident timeline graph to detect underlying vulnerabilities and predict potential future system weaknesses; and
    generating and executing recommended actions for incident resolution and system optimization including controlling an autonomous vehicle based on an optimized route generated based on real-time traffic conditions to enhance operational efficiency of the autonomous vehicle.

10. The computer program product of claim 9, further comprising adjusting preprocessing parameters based on feedback from anomaly detection outcomes to improve accuracy of anomaly identification in subsequent analyses.

11. The computer program product of claim 9, further comprising automatically notifying maintenance teams via electronic messaging about critical anomalies, including location, severity, and suggested corrective actions.

12. The computer program product of claim 9, further comprising analyzing environmental factors in conjunction with sensor data to evaluate external influences on CPS performance and incident causation.

13. The computer program product of claim 9, wherein the severity scores are calculated based on a duration and a strength of the abnormal sensor readings relative to a historical baseline.

14. The computer program product of claim 9, wherein severity ranking calculations incorporate real-time external data, including weather conditions and operational demands, to enhance anomaly impact assessments.

15. The computer program product of claim 9, further comprising integrating analysis outcomes with CPS control systems for automatic implementation of optimizations and preventative measures.

16. A system for incident analysis in Cyber-Physical Systems (CPS) using a Temporal Graph-based Incident Analysis System (TGIAS), comprising:
a processor operatively coupled to a non-transitory computer-readable storage medium, the processor configured for:
preprocessing dynamically gathered multimodal data from a distributed network of sensors across the CPS, including identifying abnormal sensor readings indicative of potential incidents;
constructing a multi-layered incident timeline graph, representing abnormal sensor readings, relationships to specific CPS components, and temporal sequencing of events, utilizing machine learning for anomaly detection and graph-based modeling of complex interactions and dependencies among system components and sensor data by:
determining nodes of the multi-layered incident timeline graph that are aligned on timelines that indicate when an incidental threshold, based on a safe buffer and a number of abnormal sensors, has been exceeded;
determining a relationship of the nodes based on a generated relationship graph that establishes the relationship between sensors including the abnormal sensors;
calculating severity scores and assigning severity rankings to identified anomalies by the processor, based on a composite index including potential impact on CPS operation, comparison with historical incident data, and predictive risk assessments;
identifying root causes of incidents and pathways for anomaly propagation through the CPS using causal inference and the incident timeline graph to detect underlying vulnerabilities and predict potential future system weaknesses; and
generating and executing recommended actions for incident resolution and system optimization including controlling an autonomous vehicle based on an optimized route generated based on real-time traffic conditions to enhance operational efficiency of the autonomous vehicle.

17. The system of claim 16, further comprising electrochemical sensors for detecting carbon monoxide and photoionization detectors for volatile organic compounds within a vehicle cabin, and a control unit configured to activate air filtration systems as a corrective action upon detection of hazardous gas levels exceeding predefined thresholds for the detected incidents.

18. The system of claim 16, wherein the processor is further configured for adjusting preprocessing parameters based on feedback from anomaly detection outcomes to improve accuracy of anomaly identification in subsequent analyses.

19. The system of claim 16, wherein the processor is further configured for automatically notifying maintenance teams via electronic messaging about critical anomalies, including location, severity, and suggested corrective actions.

20. The system of claim 16, wherein the recommended actions include preventative measures and targeted recommendations for detected incidents, using a user interface configured for displaying and initiating execution of the recommended actions for incident resolution and system optimization.

* * * * *